No. 656,125. Patented Aug. 14, 1900.
H. F. A. KLEINSCHMIDT.
BOND FOR TRACK RAILS.
(Application filed Dec. 28, 1899.)

(No Model.) 2 Sheets—Sheet 1.

WITNESSES:
G. M. Powell.
M. E. Sharpe.

INVENTOR
H. F. A. Kleinschmidt
BY
Geo. H. Parmelee
his ATTORNEY.

UNITED STATES PATENT OFFICE.

HENRY F. A. KLEINSCHMIDT, OF JOHNSTOWN, PENNSYLVANIA, ASSIGNOR TO THE LORAIN STEEL COMPANY, OF PENNSYLVANIA.

BOND FOR TRACK-RAILS.

SPECIFICATION forming part of Letters Patent No. 656,125, dated August 14, 1900.

Application filed December 28, 1899. Serial No. 741,843. (No model.)

*To all whom it may concern:*

Be it known that I, HENRY F. A. KLEINSCHMIDT, of Johnstown, in the county of Cambria and State of Pennsylvania, have invented a new and useful Improvement in Bonding Track-Rails, of which the following is a full, clear, and exact description, reference being had to the accompanying drawings, which form a part of this specification.

My invention relates to bonding track-rails, and more particularly to that class of such work in which the bonding cable or member is electrically welded to the track-rails.

In electrically welding a flat-faced block to the web of a rail, even when the parts are subjected to a heavy pressure after the weld is made for the purpose of preventing deterioration of the steel of the web, there is a portion of the latter surrounding the block which, although raised to a welding heat, cannot be acted upon by the pressure, and hence there is left around said block a weakened or deteriorated portion of metal. This weakened or deteriorated portion it is the object mainly of the present invention to prevent, while providing a simple, efficient, and easily-made bond connection.

With this object in view the invention consists in the provision of a weld-block designed to be welded to the web of a rail having a shape of such character that it will so confine the welded area that it will nowhere extend to the outside surface of the block, or, in other words, to so confine the welding area, both where the block welds to the rail and where it welds to the bonding-cable, that it can be entirely put under pressure, and thereby prevent any portion of the rail-web and cable from being permanently deteriorated.

The invention also consists in the novel bond connection and in the novel construction and combination of parts, all as hereinafter described, and pointed out in the appended claims, reference being had to the accompanying drawings, in which—

Figure 1:
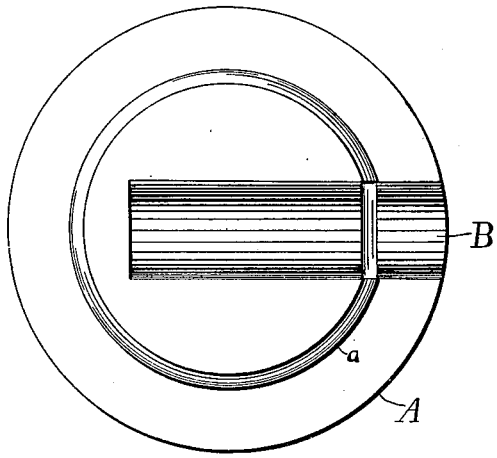
Figure 2:
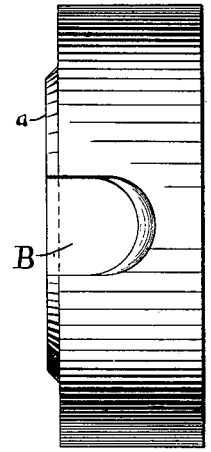
Figure 3:
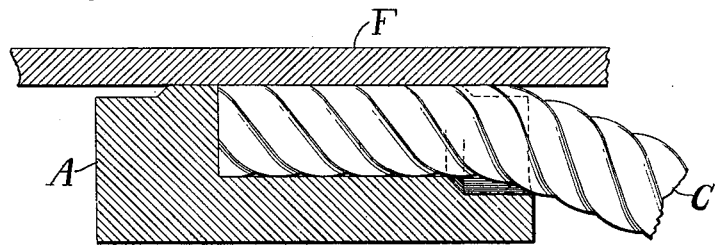
Figure 4:
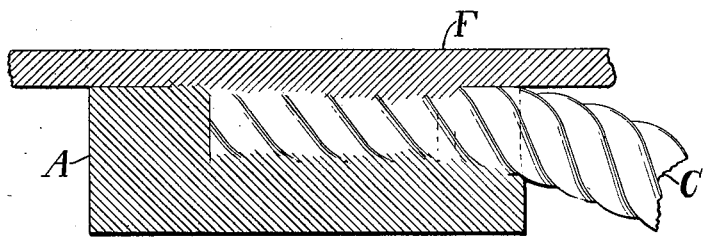
Figure 5:
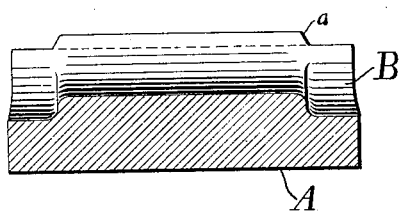
Figure 6:
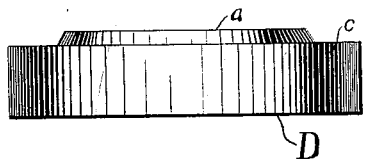

Figure 1 is a plan, and Fig. 2 an end view, of a bonding-block constructed in accordance with my invention. Fig. 3 is a horizontal section showing the block and cable applied to a rail. Fig. 4 is a similar view after pressure has been applied to the parts. Fig. 5 is a section of a slightly-different form of block. Fig. 6 is a view of a reinforcing-block for use on the opposite side of the rail-web, and Fig. 7 is a view showing the way in which the connection may be made.

The letter A designates my improved bonding-block, which I have shown as being of generally circular form, although this shape is in no wise essential to my invention. I prefer to make these blocks of copper; but this also is not essential, as I may use Bessemer or cast steel or other suitable material. On the inner face of this block is a raised central portion or boss a, adapted for contact with the web of the rail and which is welded to the rail. In practice I have found it advisable to make this boss or raised portion project about one-eighth of an inch beyond the face of the surrounding portion of the block and to make said surrounding portion in the neighborhood of one-half an inch wide. I also prefer to slightly taper the peripheral edge of the boss a. B is a deep groove cut in the inner face of said block and extending entirely across the same, as in Fig. 5, or only partially across, as in Fig. 1, according to whether it is desired to weld an intermediate or an end portion of a bonding-cable (shown at C) to the rail. The bottom of this groove conforms in outline to the outline of the inner face of the block, which provides an offset portion or portions at its ends, so that when applied to the rail and cable the latter will not contact with the rail at any point outside the diameter of the boss a.

D designates a reinforcing-block, which is preferably welded to the opposite side of the rail from the block A. This block is similar to the block A in the provision of a central boss, but it has no groove.

Figure 7:
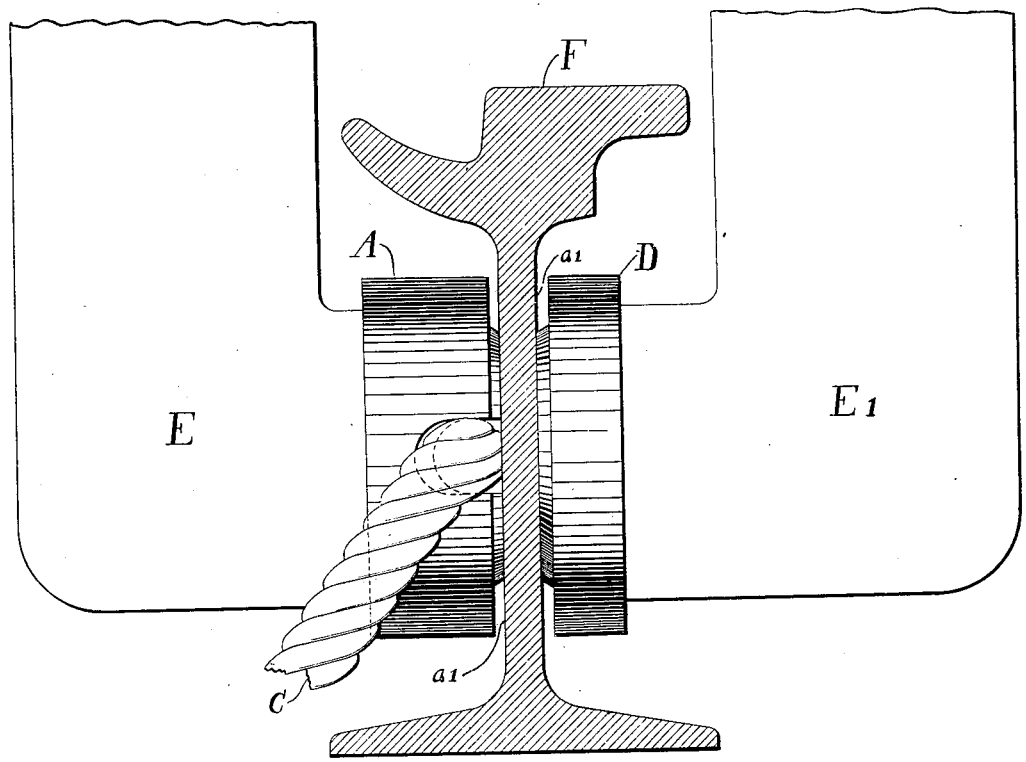

E E', Fig. 7, designate the welder-terminals, which also act as clamps, and F designates the rail to which the weld is to be made.

In making the connection the cable C is placed against the rail-web and the block is placed over it, so that the cable lies in the groove B. The block D is then applied to the opposite side of the rail-web and the whole is clamped between the terminals E E' of the welder, as shown in Fig. 7. The welding-current is then passed through the parts from one terminal to the other. The only portion of the web which is brought to a full welding heat is that which is immediately in contact with the bosses $a$, although the surrounding portion $a'$ within the diameter of the block is heated very nearly to that point or to a sufficient extent to cause deterioration of the steel were an ordinary flat block employed. This heated area, however, is confined within the limits of the diameter of the blocks. As soon as the welding heat is reached a heavy pressure is applied through the terminal clamps and the blocks are forced up solidly against the web over their entire surface, thus exerting pressure upon the heated area $a'$ as well as upon that area where the weld is actually made. In this manner permanent deterioration of the steel in the portion $a'$ is prevented.

It should be stated that when the block is made of copper a piece or strip of iron or other metal of relatively less resistance should be interposed between the block and the welder-terminal in order to bring the copper to a welding heat. This is because of the high conductivity of copper.

It is obvious that the shape of the blocks and the dimensions which I have above stated may be varied to a considerable extent without departing from my invention, the essential feature in which is that of so confining the welded area within the perimeter of the block that all portions of the web which are subject to deteriorating heat may be subjected to pressure through the block. Hence I do not wish to limit myself to the particular construction and arrangement shown and described.

Having thus described my invention, what I claim, and desire to protect by Letters Patent, is—

1. A welding-block for use in bonding electric-railway track, said block having its welding-face provided with a raised portion and with a seat for a bonding member, substantially as described.

2. The herein-described weld-block for use in bonding track-rails, said block having that portion of its surface which is designed to form the weld raised above the surrounding portion and provided with a seat for a bonding member, substantially as described.

3. The herein-described weld-block for use in bonding track-rails, said block having its inner face formed with a depressed marginal portion and having a seat for a bonding device, substantially as described.

4. The herein-described weld-block for use in bonding track-rails, said block having a raised weld-surface and a surrounding depressed portion designed to be pressed into contact with the rail-web, said block also having a groove extending across said depressed portion into the raised portion, substantially as described.

5. The herein-described weld-block for use in track-bonding work, said block having a central peripherally-tapered welding portion provided with a groove to seat a bonding-cable, substantially as described.

6. The herein-described weld-block for use in track-bonding work, said block having a raised boss, and a cable-seating groove in said boss, substantially as described.

7. The herein-described weld-block for use in track-bonding work, said block having a raised central boss, and a groove extending into the same, said groove having its bottom wall depressed exteriorly of the said boss, substantially as described.

8. The herein-described welded connection for rail-bonding cables, comprising a grooved block in which the cable is seated and welded to the web of the rail, said block being also welded to the rail by a central boss, substantially as described.

9. In a welded connection for rail-bonds, the combination with a bonding-cable, of a block having on its inner face a grooved boss in which the cable is seated and which with the cable is welded to the web of the rail, the weld between the cable and rail being confined entirely within the lines of said block, substantially as described.

10. In a welded connection for rail-bonds, the combination with a bonding-cable, of a block having a central grooved boss in which the cable is seated and which is welded to the web of the rail, the marginal portion of said block surrounding said boss being also forced into contact with said web, substantially as described.

11. In a welded connection for rail-bonds, the combination with the rail of the two blocks having raised central bosses welded to the web of the rail upon opposite sides of the same and marginal portions in contact with said web, one of said blocks having a groove therein for the bonding-cables, substantially as described.

12. In a welded connection for rail-bonds, the combination with the rail, and the bonding-cable, of a block welded to one side of the rail-web and having a groove in which the cable is seated, said cable being also welded to the said web, and a reinforcing-block upon the opposite side of said web and welded thereto by a central boss, said blocks having their marginal portions forced against said web, substantially as described.

13. In a welded connection for rail-bonds, a pair of blocks welded to opposite sides of the rail by central bosses thereof, and having their marginal portions pressed against the rail and embracing that portion of the rail around the weld which was subject to the deteriorating heat thereof, one of said blocks having a bonding-cable also welded to the rail therein, substantially as described.

14. The herein-described weld-block for the purpose described having a central boss formed with a seat therein for a bonding member, and designed to be welded to the web of a rail, and a surrounding depressed portion of sufficient area to embrace that portion of the rail-web which is subject to the deteriorating heat of the weld, substantially as described.

In testimony whereof I have affixed my signature in presence of two witnesses.

H. F. A. KLEINSCHMIDT.

Witnesses:
 MYRTLE E. SHARPE,
 H. W. SMITH.